United States Patent [19]
Brooks

[11] Patent Number: 4,828,325
[45] Date of Patent: May 9, 1989

[54] METHOD OF MAKING A CUSTOM FITTED COMPOSITE FOAMED CUSHION, A PREFORM KIT AND THE RESULTANT PRODUCT OF THE PROCESS

[75] Inventor: William R. Brooks, Elmhurst, Ill.

[73] Assignee: University of Tennessee Research Corporation, Knoxville, Tenn.

[21] Appl. No.: 102,490

[22] Filed: Sep. 29, 1987

Related U.S. Application Data

[60] Continuation of Ser. No. 863,942, May 16, 1986, abandoned, which is a division of Ser. No. 710,480, Mar. 11, 1985, abandoned.

[51] Int. Cl.$^4$ .................. A47C 7/20; B29C 67/22; B29C 43/12
[52] U.S. Cl. .................. 297/458; 264/45.2; 264/46.6; 264/222; 264/314; 297/452
[58] Field of Search .................. 264/45.2, 46.6, 222; 264/314; 297/458, 452

[56] References Cited

U.S. PATENT DOCUMENTS

| | | | |
|---|---|---|---|
| 2,150,287 | 3/1939 | Minor | 297/DIG. 1 |
| 2,552,039 | 5/1951 | Flogaus | 297/459 |
| 2,847,061 | 8/1958 | Morton | 297/DIG. 1 |
| 3,511,537 | 5/1970 | Ackermann | 297/458 X |
| 3,751,111 | 8/1973 | Taylor et al. | 297/DIG. 1 |
| 3,774,968 | 11/1973 | Fenton | 297/452 |
| 3,778,104 | 12/1973 | Kusters | 297/458 |
| 4,123,213 | 7/1980 | Burnett | 297/284 X |
| 4,327,046 | 4/1982 | Davis et al. | 264/222 X |
| 4,347,213 | 8/1982 | Rogers, Jr. | 264/222 X |
| 4,622,185 | 11/1986 | Kostich | 264/222 X |

FOREIGN PATENT DOCUMENTS

| | | |
|---|---|---|
| 2250681 | 4/1974 | Fed. Rep. of Germany . |
| 2510471 | 2/1988 | France . |
| 3120269 | 12/1982 | German Democratic Rep. . |
| 2069917 | 9/1981 | United Kingdom .......... 264/222 |

OTHER PUBLICATIONS

Hobson, Douglas A. and Olunwa M. Nwaobi, "The Relationship Between Posture and Ischial Pressure for the High Risk Population," Paper presented at 1985 Resna Meeting, Memphis, Tenn., June 24–28th, 1985, 4 pages.

*Primary Examiner*—Philip Anderson
*Attorney, Agent, or Firm*—Luedeka, Hodges & Neely

[57] ABSTRACT

An orthotic support system is embodied as cooperating seat and back cushion elements for assembly into a wheelchair frame. These cushion elements are custom-fitted to the individual patient by injecting an incipiently reacting and foaming, fluorocarbon-blown polyurethane chemical system into the space between a rigid mold box and an elastic membrane which is fitted over the open face of the mold box and which is deformably engaged by the appropriate portions of the patient's torso. The foaming mixture is injected in predetermined excess volume and expands against the physical resistance of the patient's body where contact is made with the corresponding regions of the elastic membrane; and this forcible engagement produces selective densification of the foam where a high degree of body support is required. Elsewhere, the foam expands more freely and stretchably inflates the membrane to generate graduatedly less dense regions matably contoured to fit or partially embrace the patient. For body alignment purposes, specialized bolsters are integrally formed in the cushion elements.

16 Claims, 5 Drawing Sheets

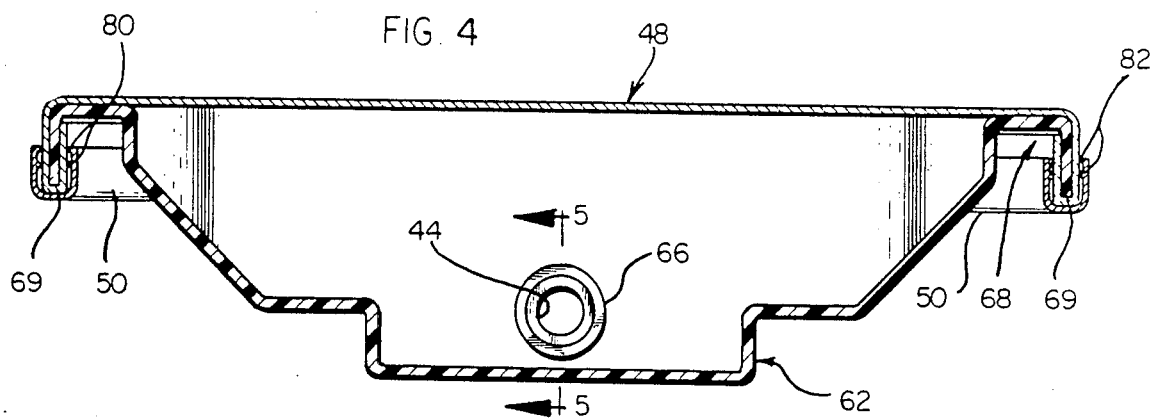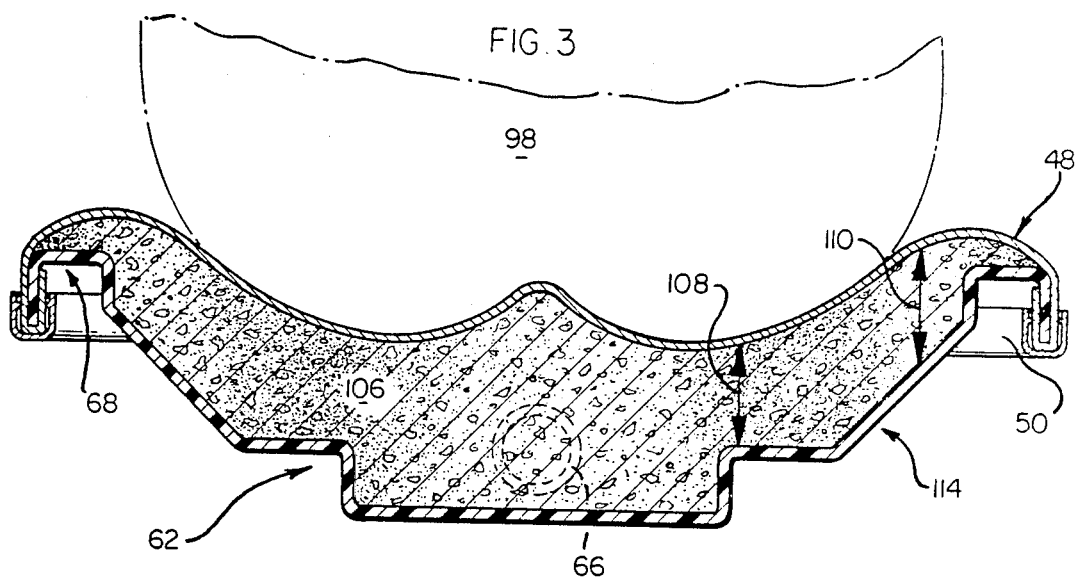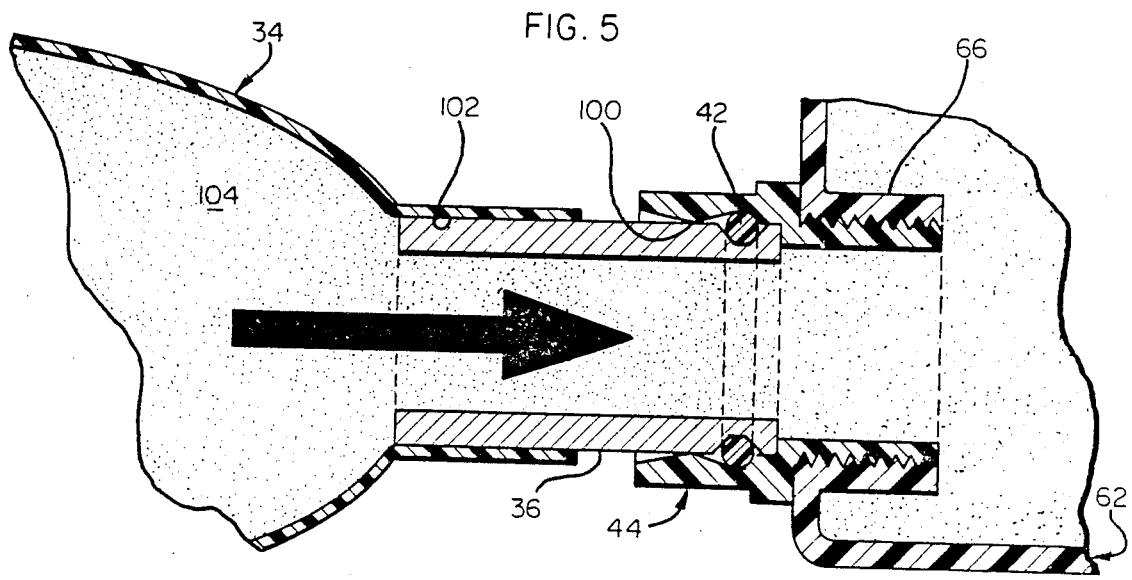

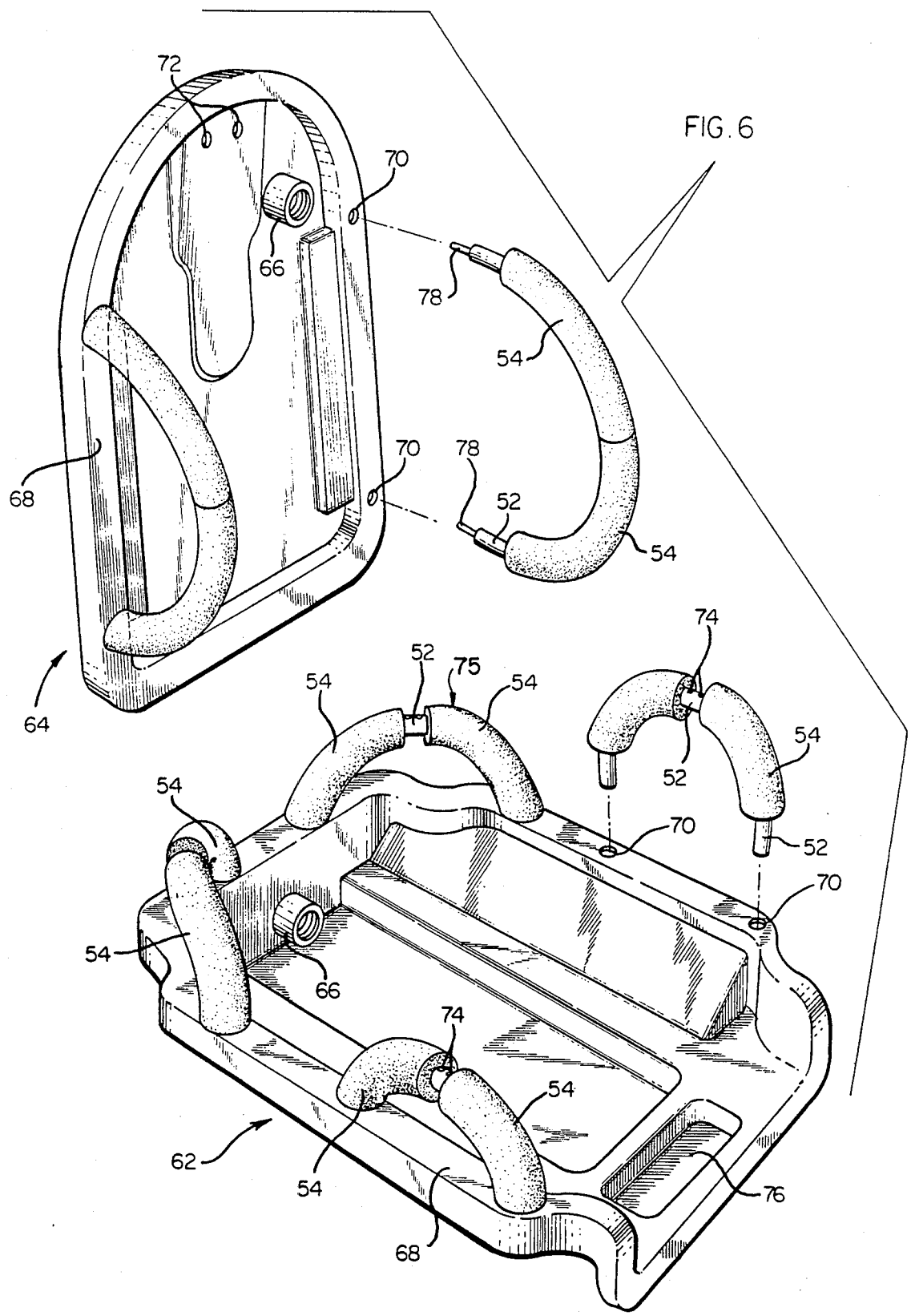

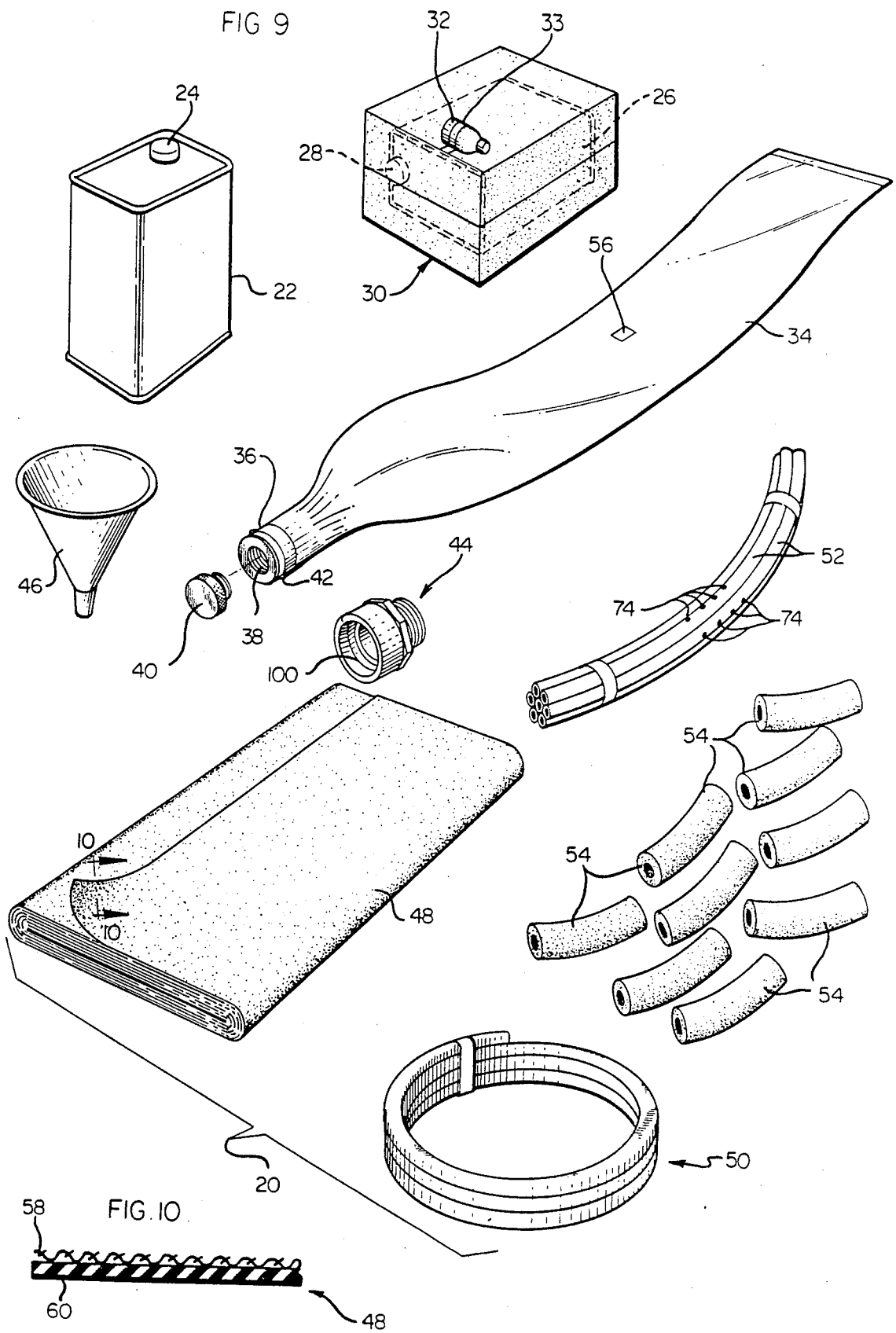

METHOD OF MAKING A CUSTOM FITTED COMPOSITE FOAMED CUSHION, A PREFORM KIT AND THE RESULTANT PRODUCT OF THE PROCESS

This is a continuation of co-pending application Ser. No. 863,942, filed May 16, 1986, and now abandoned, which is a divisional of application Ser. No. 710,480, filed on Mar. 11, 1985 and now abandoned.

FIELD OF THE INVENTION

This invention relates generally to commercial applications of foam-in-place urethane chemistry, more particularly to the application of such chemistry to the human engineering aspects of seating systems and, in one specific aspect, to an orthotic support system.

BACKGROUND OF THE INVENTION

Postural control of non-ambulatory persons has long been a goal of numerous rehabilitation therapists; and the target groups have included patients with sensation loss (such as paraplegics and quadriplegics) and severely involved children and young adults suffering with such infirmities as cerebral palsy, muscular dystrophy, spina bifida and other neuromuscular disorders. Improper body support of the patient with sensation loss frequently manifests itself in the development of pressure sores, sometimes referred to broadly as decubitus ulcer, whereas the objective of the specialized body support of the patient having a neuromuscular anomaly is a combination of comfort and good body alignment in the seated position.

In the past, avoidance of tissue breakdown in those suffering from sensation loss has been approached either by frequent nursing repositioning of the patient or by the use of force-distributing cushions of various configurations. On the other hand, seating apparatus for the severely handicapped, cerebral palsied and muscular dystrophy population has traditionally involved the fitting of auxiliary bolsters to a conventional wheelchair.

Three different and differing approaches to a customized total-contact seating for the severely handicapped have also been attempted. The first and the most widely used has been the "cut and try" scheme in which body supports are hand-carved from blocks of flexible foam on a trial-and-error basis. Once adequate contours have been obtained, the shaped foam supports are fastened into a receptacle (usually plywood) which interfaces the foam pieces with a standard wheelchair. Thereafter, vinyl upholstery or stretch fabrics have been employed to cover the foam shapes to provide durability and aesthetics. This approach has proved to be both time-consuming and expensive and further requires a reasonably high degree of technical skill to obtain good total-contact supporting surfaces.

The secomd approach, sometimes termed the "wrap-and-try" method, follows the principles used in prosthetics and orthotics and begins with making a positive plaster mold from a direct plaster wrap of the patient's body. A plastic laminate or plastic-vacuum-formed seat or back component is then fabricated over the positive plaster mold. A foam lining material, or the plastic itself, is relied upon to accommodate minor adjustments for relieving any areas of serious, remaining discomfort.

The third approach to total-contact seating has attempted to simplify the foregoing method by eliminating the plaster wrap. This approach, referred to as the "vacuum fixation" technique, uses a large, airtight bag filled with polystyrene beads into which the patient is positioned. Evacuation of the air from the bag causes the beads to lock mechanically together into a rigid mass so that the solidified, molded bag can then be used as a receptacle to make the positive plaster mold. Final fabrication of the seat or back then follows the steps outlined in the previously described approach.

The latter two schemes have proved to be time-consuming but usually result in improved total-contact seating supports. Unfortunately, they also result in large plaster mold shapes over which there is usually some difficulty forming a final plastic seating component. In addition, a high degree of technical skill is required to obtain a proper positive plaster mold of the patient's body shape. Furthermore, specialized skills are required in order to fabricate the final plastic product using either thermal-forming or thermal-setting plastic materials.

More recently, attempts have been made to develop orthotic seating components by the use of foam-in-place polyurethane systems. However, applicant has discovered that reliance on expansion of the foam alone to fill the seating cavity in this work has limited the degree of contouring and the strength of support which can be obtained from the resultant cushions. These prior art attempts to employ foam-in-place techniques have also failed to provide graduated foam density in the cushion and thus do not achieve the desired distribution of the patient's body weight.

Accordingly, a general object of the present invention is to provide new and improved apparatus and methods of making a custom-fitted cushion for a seating device or the like.

Another object of the invention is to provide a new and improved orthotic support system which combines optimum weight distribution with excellent body alignment forces.

Still another object of the invention is to provide a method of making an orthotic support which is remarkably fast, efficient and economical to practice and which requires a minimal involvement of medical specialists.

These and other objects and features of the invention will become apparent from a consideration of the following descriptions.

BRIEF DESCRIPTION OF THE INVENTION

In compliance with the principles of the present invention, an orthotic support system is embodied as co-operating seat and back elements for assembly into a wheelchair frame. These cushion elements are custom-fitted to the individual patient by injecting an incipiently reacting and foaming, fluorocarbon-blown polyurethane chemical system into the space between a rigid mold box which is actually a preform or support member that becomes an integral part of the final orthotic support system, and an elastic membrane which is fitted over the open face of the mold box and which is deformably engaged by the appropriate portions of the patient's torso. The foaming mixture is injected in predetermined excess volume and expands against the physical resistance of the patient's body where contact is made with the corresponding regions of the elastic membrane; and this forcible engagement produces selective densification of the foam where a high degree of body support is required. Elsewhere, the foam expands more freely and stretchably inflates the membrane to generate graduatedly less dense regions matably contoured to fit or partially embrace the patient. For body alignment purposes, specialized bolsters are integrally formed in the cushion elements.

BRIEF DESCRIPTION OF THE DRAWINGS

The invention, both as to the materials and components employed and the steps of fabrication, will be better understood by reference to the following disclosure and drawings forming a part thereof, wherein:

FIG. 3 is a further enlarged cross-sectional view taken substantially along the Line 3—3 of FIG. 2 and suggesting the gradient in the density of the cushion-forming foam which is achieved in the practice of the present invention;

FIG. 4 is a view similar to the showing of FIG. 3 but illustrating the mold box and stretchable membrane assembled without the patient in place and without the polyurethane foam contents;

FIG. 5 is a still further enlarged view taken substantially along the Line 5—5 of FIG. 4 and illustrating a quick-connect coupling employed in assembling a foam mixing-and-dispensing vessel with the seat mold box;

FIG. 6 is a perspective view of the mold boxes for the seat and back, illustrating various structures used in generating selected, integral bolster formations in the finished, custom-fitted cushions;

FIG. 9 is a perspective view of the components of the kit used in foaming a custom-fitted cushion in compliance with the present invention, mold box excluded; and FIG. 10 is an enlarged, cross-sectional view taken substantially along the Line 10—10 of FIG. 9 to show the lamination of stretchable upholstery fabric to a substrate latex sheet to form the integral upholstery and barrier layer of the membrane which is used in the present invention to close off the open side of the mold box.

DETAILED DESCRIPTION OF THE INVENTION

Figure 1:
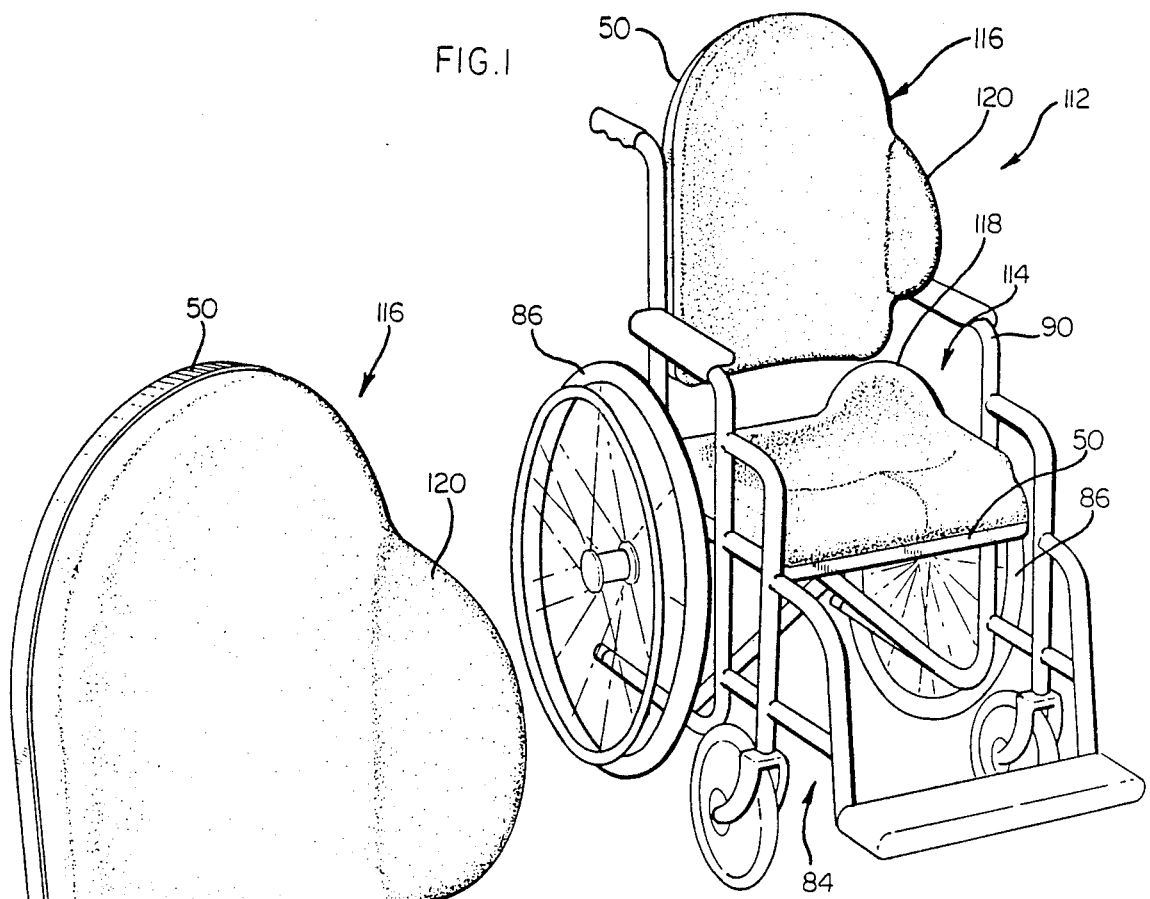
FIG. 1 is a perspective view of a wheelchair equipped with custom-fitted seat and back cushions constructed in compliance with the present invention.

Custom-fitted seating is generally accepted as one important facet of the medical and therapeutic management of severly disabled persons; and it is recognized that, with specialized seating, many severely handicapped patients can be advanced from a bedbound condition to an upright posture where motor development and cognitive skills can be encouraged.

As will be appreciated, each individual patient must be evaluated and a determination made that he or she is an appropriate candidate for specialized seating; and three pivotal considerations have emerged as being useful to such an evaluation, namely: (1) the degree to which the person can attain and sustain voluntary postural control, (2) the existence of or potential for skeletal deformity, and (3) the degree to which protective, neural sensation has been impaired.

Once an individual has been determined to be a suitable candidate for specialized seating, a wheelchair is most commonly selected as the appliance of choice in which to create the specialized seating; and in accordance with the principles of the present invention, a polyurethane foam formulation is employed in fabricating the custom-fitted seating components of a rollable orthotic support system by means of foam-in-place techniques.

The polyurethane formulations of the present invention are selected to produce a foam which is commercially classified as "flexible" rather than "rigid"; and in order to realize the desired self-skinning properties and resultant strength, these formulations advantageously produce a foam having a free-rise density of at least about 5 lbs/ft$^3$. A foam density of this order provides an integrity of configuration so as to prevent the cushion from following the movement of the patient. Furthermore, in order to achieve sufficiently rapid rates of rise, set and final cure, and in order to realize an acceptable storage life of the packaged chemicals, a two-component polyurethane system is selected to exhibit comparatively high molecular weight with relatively low hydroxyl number. Specifically, the polyurethane mixtures of the present invention possess an isocyanate-equivalent to hydroxyl-equivalent ratio of between about 0.75 and about 2.00.

Representative isocyanate materials for use in the invention include the diisocyanates and polyisocyanates. Specific materials comprise the aromatic diisocyanates such as 2,4-tolylene diisocyanate; polymethylene diisocyanates such as tetramethylene diisocyanate; and mixed isocyanate-isothiocyanates such as 1-isocyanate, 6-isothiocyanate hexane. Representative polyisocyanates include toluene triisocyanate, triphenylmethane triisocyanate, and benzene triisocyanate. Preferred isocyanate material comprises the aromatic isocyanates such as diphenylmethane diisocyanate.

Representative hydroxyl-rich resins for reaction with the isocyanate material include the polyesters which are esterification products of a dicarboxylic acid and a polyhydric alcohol. Other useful hydroxyl-rich resins comprise the polyether polyols. The polyol component of the invention is specifically selected to be of comparatively low viscosity, that is, measuring on the order of 600 centipoises or less; and when a polyether polyol is selected, it is desirably the reaction product of a resin such as the acrylonitrile-butadiene-styrene copolymers. For purposes of regulating the viscosity of the polyol component, the hydroxyl-rich resin is preferably mixed with a fluorocarbon blowing agent such as trichlorofluoromethane.

Suitable catalysts are also advantageously incorporated in the polyol component and may include tertiary amines and organotin compounds. The catalyst for the addition reaction of the isocyanate and the polyol is particularly selected so as to limit the foam-in-place cushion temperature at the patient interface to less than 105° F. during foaming.

The instant compositions may also include other materials conventionally incorporated in polyurethane formulations, such as flame-retardants of the chlorine-phosphorus type and foam-stabilizing surfactants.

The polyurethane foam formulations of the invention typically exhibit a rise time of about 2 minutes, a set time of about 5 minutes, and a final cure time of about 4 hours.

In compliance with the present invention, a predetermined amount of liquid isocyanate material is provided in a suitable container; the liquid polyol component, and other polyurethane ingredients including the fluorocarbon blowing agent, are packaged in a separate container; and these two containers are assembled into a "kit" with the other parts and materials required to fabricate either a foam-in-place seat cushion component or a foam-in-place back cushion component for a wheelchair.

Referring now in detail to the drawings and giving first attention to FIG. 9, a typical foam-in-place kit assembled in compliance with the present invention is indicated generally by the reference numeral 20 and includes:

a "B" Component metal container 22 which is filled with a predetermined quantity of the polyol blowing agent mixture and which is closed with conventional screw cap 24;

an "A" Component metal container 26 which is filled with a stoichiometrically selected amount of the isocyanate material, which is closed by a conventional screw cap 28, and which is fitted between the clamshell halves of a rigid polystyrene foam insulator body 30, a clear glass bottle or vial 32 being exteriorly attached to the body 30 as by an adhesive strap 33, the vial 32 containing a small quantity of the "A" Component to provide visual indication of exposure of the package to temperatures below a selected control temperature, such as 65° F., as shown by the formation of crystals in the isocyanate resin;

an elongate mixing-and-dispensing bag 34 which is fabricated from a chemically resistant plastic film, such as polyethylene, and which is seamed at one end and closed at the other end by a tubular fitment 36, fitment 36 having an internally threaded bore or mouth 38 which is adapted to receive a cooperatively threaded closure plug 40 and which is externally grooved to accept an O-ring 42 which is used in making a quick-connect coupling with a cooperating, foam inlet fitment 44, as will be described more fully hereinafter;

a conventional, polyethylene funnel 46 for use in manually pouring the contents of containers 22 and 26 into the mixing-and-dispensing bag 34;

a suitable quantity of laminated upholstery fabric 48;

a coil of upholstery edge molding material 50;

a suitable number of tubular, centrally radially vented bolster support elements 52; and a cooperating number of tubular elastomeric or foam cover or sheath elements 54, elements 52 and 54 being adapted for assembly in forming posture-control bolsters in the cushion component, as will also be described more fully hereinafter, and as is illustrated, for example, in FIGS. 1 and 2.

In compliance with the present invention, a temperature sensor 56 is adhesively fastened to the mixing-and-dispensing bag 34 in thermal communication with the interior thereto in order to provide a litmus-type indication of abnormal exotherm resulting from reaction of the "A" and "B" Components during the mixing procedure. Usefully, the sensor 56 changes from a grey color to black upon reaching a temperature of 110° F., for example.

In further accord with the present invention, the laminated upholstery fabric 48 comprises a stretchable, substantially imperforate membrane which includes an elastic upholstery surface layer 58 and an imperforate, elastic base layer 60 adhesively bonded face-to-face with the surface layer 58. Advantageously, the upholstery surface layer is selected to be a two-way stretch, nylon spandex fabric and the base layer 60 is selected to be an essentially pinhole-free latex rubber sheet substantially matched to the surface layer 58 in the degree of elasticity. One eminently suitable material for the base layer 60 is DK lineal latex sheeting of 0.006 inch thickness manufactured by Hygienic Dental Manufacturing Company.

The instant fabrication kit additionally includes a rigid, thin-wall mold box or preform which is fashioned with an open side and with one or more venting passageways of restricted aperture size. Turning to FIG. 6, a typical seat cushion mold box is indicated generally by the reference numeral 62 and a typical back cushion mold box is indicated generally by the reference numeral 64. These components are conveniently manufactured from acrylonitrile-butadiene-styrene copolymer material employing conventional vacuum-forming techniques; and in order to accommodate fabrication of the custom-fitted cushions using the foam-in-place method, the mold boxes 62 and 64 are dimensioned to fit the respective seat and back framework regions of a standard wheelchair module, replacing the sling upholstery ordinarily provided with such a module. As will be apparent from the drawings, particularly FIGS. 3-5 and 7-8, the mold boxes 62 and 64 become an integral part of the final seat and back cushions, respectively.

Each mold box is fashioned with an internally threaded, inwardly extending tubular formation 66 which is adapted to receive the externally threaded end of the foam inlet fitment 44; and in compliance with the present invention, each mold box is constructed with a peripheral rim or flange 68 of generally U-shaped cross-section as is shown in FIG. 4, rim 68 surrounding and defining the open side of the mold box. The rim 68 also defines an out-of-sight lip or edge 69 for use in attaching the laminated upholstery fabric 48. The rim 68 serves as a mounting site for both the bolster support elements 52 and the cooperating foam elements 54. Specifically and with reference to FIG. 6, the flange of rims 68 is perforated with suitably positioned apertures 70 which are sized to accept the tubular bolster support elements 52 in slidable manner after the foam elements 54 have been slipped over the support elements.

In accordance with the present invention, the incipiently reacting, foaming polyurethane mixture is injected into the space defined between a mold box and the stretchable membrane which closes the otherwise open side thereof; and in compliance with an important feature of the invention, this mixture is injected in a quantity in excess of the volume defined between the mold box and the membrane, for purposes to be described more fully hereinafter. Cooperating in this purpose, the mold box is fashioned with venting passageways of restricted aperture size in order to allow egress of air and other gases, as well as excess quantities of the foaming mixture, all under mild back-pressure conditions. In particular, the back cushion mold box 64 is drilled with one or more restricted vent holes 72 near the top edge of the mold box and preferably above the level of the tubular formation, as is generally indicated in FIG. 6. The seat cushion mold box 62 is differently vented. There, the tubular bolster support elements 52 are centrally radially vented with a longitudinal series of apertures 74, shown in FIGS. 6 and 9; and as will be seen with particular reference to FIG. 6, the tubular foam elements 54 are spaced apart upon assembly to the seat cushion mold box 62 to free the apertures 74 for the venting function. As is suggested in the configuration of back cushion mold box 64 in FIG. 6, the tubular foam elements 54 may be abutted there because of the separate provision of vent holes 72.

A suitably configured cavity or recess 76 is advantageously fashioned in the front of seat cushion mold box 62 to accept a tubular bolster-support element 52 for use in forming a bolster for preventing the patient from sliding forward in the seat or, alternatively, to serve as a mounting site for positioning a urinal between the thighs of those patients who have difficulty in transfer and mobility relative to the wheelchair.

As will be appreciated, not all patients will require the maximum number of possible bolsters which has been suggested in the illustration of FIG. 6, while other patients may require different bolster configurations. For example, some patients may only require a single seat cushion bolster, such as that designated at 118 in FIG. 2. These latter requirements may be readily accommodated by the expedient of drilling appropriately positioned holes in the flange or rim 68.

If desired for purposes of additional rigidity or for forming an irregular shape, a manually bendable rod 78, fabricated for example from a suitable lead alloy, may be inserted into the bore of the tubular bolster support elements 52 which are employed in connection with the back cushion mold box 64. An attachment block, not shown, may additionally be secured to th rear wall of back cushion mold box 64 for positioning an "Otto Bock" headrest or other similar appliance; and as will be appreciated, the mold boxes, after foaming procedures have been performed, as will be described immediately hereinbelow, will be secured to the wheelchair framework with suitable hardware.

After whatever desired bolster-support elements 52 have been assembled to the respective mold boxes the open side of the respective mold boxes will be fitted with a stretchable, substantially imperforate membrane. Specifically and with reference to FIG. 4, a suitably sized piece of the stretchable, laminated upholstery fabric 48 will be stretched across the open side of the mold box 62 and over any bolster-supporting assemblies 75 which have been assembled from the tubular bolster support elements 52 and the tubular foam elements 54. The laminated upholstery fabric is advantageously stretched in order to store tensile forces or stresses in the elastic materials of the fabric; and these tensile forces establish mild resistance to the expansion of the foam in order to promote rupture of the surface cells of the foam upon the expanding foam material encountering the fabric. The cells, thus broken, form a polyurethane liquid layer that cures to an integral skin over the underlying foamaceous substrate, and this skin imparts the basic strength to the foam component. Stretching of the upholstery fabric 48 over the mold box also minimizes external wrinkles in the surface of the finished cushion thereby providing a smooth, attractive part.

In order to stretchably mount the fabric 48 over the mold box 62, the edges of the fabric are folded over the lip 69 of mold box flange 68 to be held in place by means of the upholstery edge molding material 50; and as will be seen in FIG. 4, the edge molding material 50 is fashioned with internal ribs for positively securing the edge molding and the margins of the fabric 48 in place, specifically confronting sets of ribs 80 and 82 formed on the inside of the channel defined by the U-shaped configuration of the edge molding.

Figure 7:
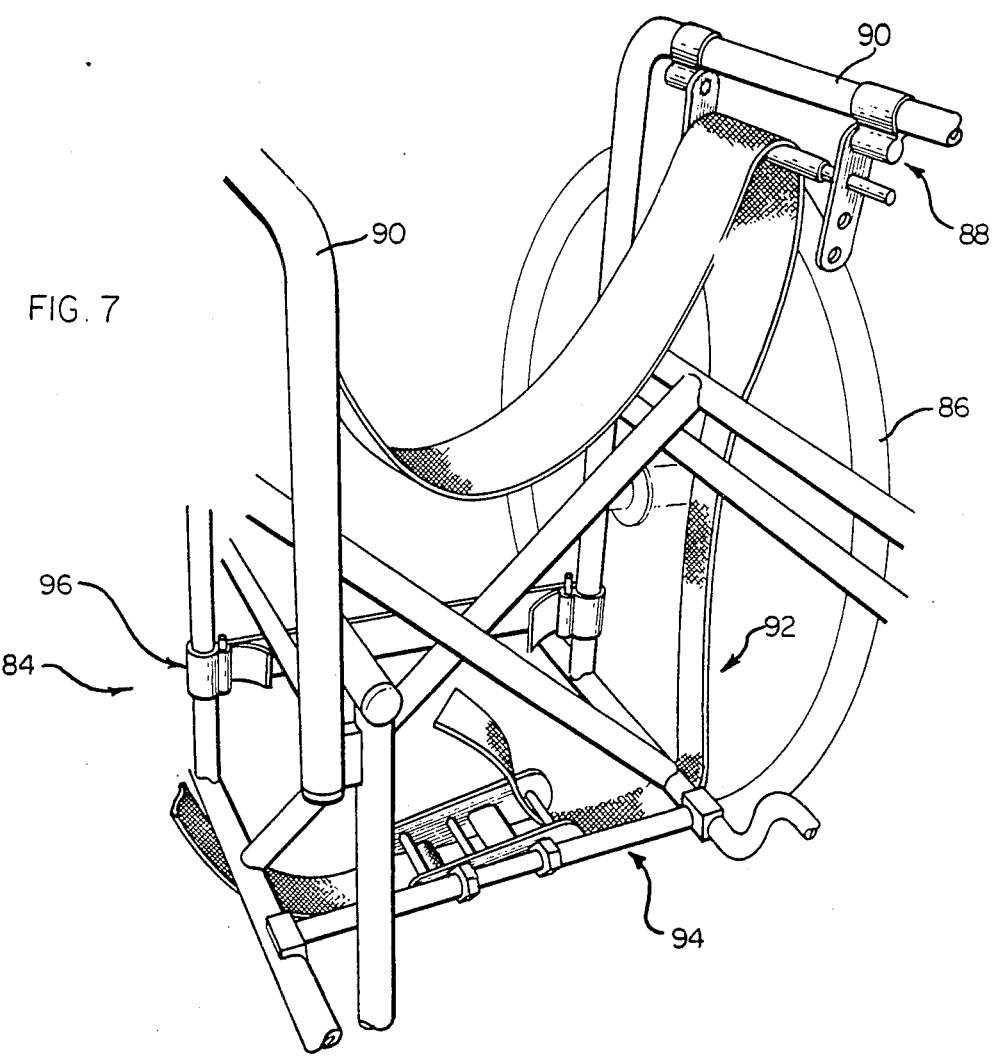
FIG. 7 is a partial view of a wheelchair frame outfitted with a sling arrangement for supporting the patient's body interjacent the wheelchair in preparation for manufacturing a custom-fitted seat cushion.

Turning now to a consideration of FIG. 7, a wheelchair framework indicated generally by the reference numeral 84 is rollably supported in conventional manner on wheels 86; and suitable roller hardware components 88 are connected to the arms 90 of the framework 84 for use in draping an aircraft seatbelt assembly 92 across the distance spanning the seat of the chair, the assembly 92 constituting a patient-positioning sling. A temporary spreader unit 94 may be fitted into the framework 84 in conjunction with a tensioning strap unit 96 to preserve the configurational integrity of the wheelchair framework 84 in the absence of a seat unit during the foam-in-place procedure.

Figure 8:
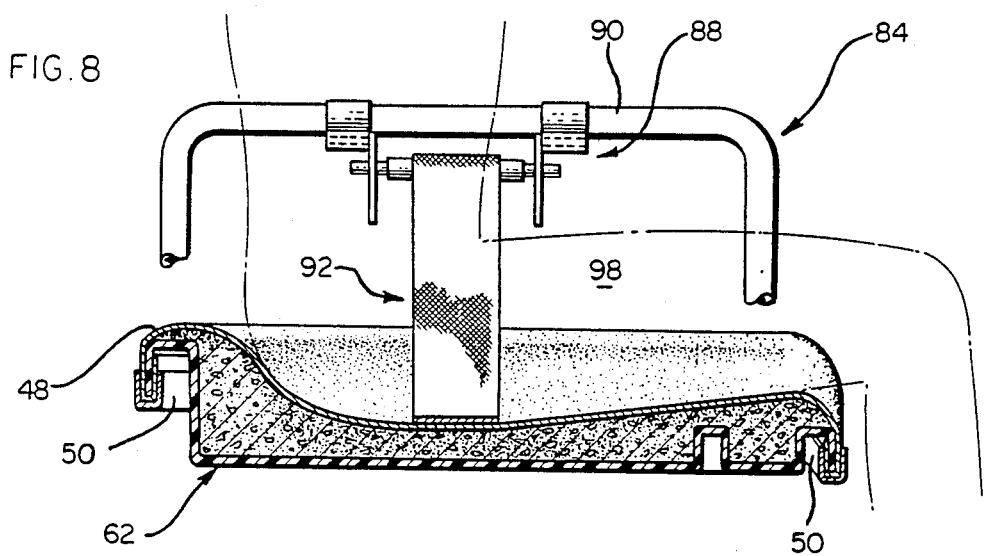
FIG. 8 is a side-elevational view in partial cross-section illustrating the position of the patient's hips and legs as well as the resultant configuration generated in the foam-in-place seat cushion.

The seat cushion mold box or preform 62 which has been closed with the upholstery fabric 48 will next be positioned rigidly in the wheelchair framework 84 and the patient's body 98 will be suspended over the mold box in deformable engagement with the fabric 48, as is suggested in FIG. 8. For optimum facility in practicing the foam-in-place technique, care is exercised to provide a minimum of one-inch clearance between the mold box and the confronting portions of the patient's body.

With the covered mold box mounted in the wheelchair and with the patient properly positioned in the assembly 92 in deformable engagement with the fabric 48, the polyurethane chemicals will be prepared for foam-in-place fabrication of a custom-fitted cushion.

First, the "B" Component is poured from the container 22 into the mixing-and-dispensing bag 34 using the funnel 46; and after the sensor 32 has been checked and found acceptable, the "A" Component will be poured from the container 26 into the bag 34. The plug 40 will then be screwed into the mouth 38 to close the bag which then will be grasped manually at both ends to be tilted back-and-forth vigorously and twisted to promote a swirling action of the liquids in mixing the same. Attention will be provided to the sensor 56 to insure no abnormal temperature rise during mixing which will then proceed for about fifteen seconds. At the end of that time, the plug 40 will be unscrewed; and the tubular fitment 36 will be quickly pressed into the inlet fitment 44 that is mounted in the mold box. With reference to FIG. 5, the fitment 44 will be seen provided with an annular, restricted throat 100 which cooperates with O-ring 42 to establish a quick-connect coupling between the bag 34 and the mold box 62. As will also be seen in FIG. 5, the bag 34, is sealed to the fitment 36 at a bonded juncture 102.

The mixed contents 104 of the bag 34 will be squeezed and drained into the mold box; and the operator will close one fist over the bag 34 adjacent the fitment 36 to insure tactily the existence of back-pressure during the foaming reaction of the chemicals. Once they have been mixed and dispensed into the mold box, the polyurethane chemicals react, foam, and expand volumetrically, expelling air and other gases through the vent means provided, and filling the mold box cavity. Some overflow foam exits through the vents; and the operator will allow the remainder to back into the bag 34. After five minutes elapsed time, the foam will have set and the patient can be removed from the positioning sling.

In compliance with the present invention, the instant polyurethane chemicals are proportioned to provide a free-rise volume of at least 10% in excess of the nominal volume of the stretchably covered mold box without the patient in place, and preferably 20% in excess thereof. This excess of the foaming material insures: (1) filling of the mold box cavity, (2) invasion of the foam around the bolster support elements and between the mold box flange 68 and the fabric 48 to generate a cushioned margin, and (3) expansion of the foam to stretch the fabric 48 around the sides of the patient's body to make a truly custom-fitted appliance. Unexpectedly, the expansion of excess foam chemicals against the back-pressure of restricted vent passageways generates a density gradient in the finished foam. As is shown in FIG. 3, a cured foam seat cushion body 106 has a first region 108 of comparatively higher density, such as about 8.0 lbs/ft$^3$, corresponding to areas of intense contact with the patient's body, a second region 110 of comparatively lower density, such as about 5.3 lbs/ft$^3$, corresponding to areas of lesser or no contact with the patient's body, and a density gradient between such regions. These regions of differential foam density match themselves to the regions where comparatively greater and lesser support of the patient's body weight is required because of the response of the foam-in-place phenomenon to the suspended presence of the patient. As will be appreciated, the chemically active foam mass responds to a heavier patient or to a localized spot of greater weight concentration by automatically increasing its density and providing greater buoyancy. According to the present invention, the ratio of the density of the region 108 to the density of the region 110 is at least about 1.2 to 1. The differential density in the finished foam cushion body accomplishes an elegant distribution of the seated patient's weight and attenuates any propensity for the development of pressure sores or ulcers in the sensation impaired subject.

Figure 2:
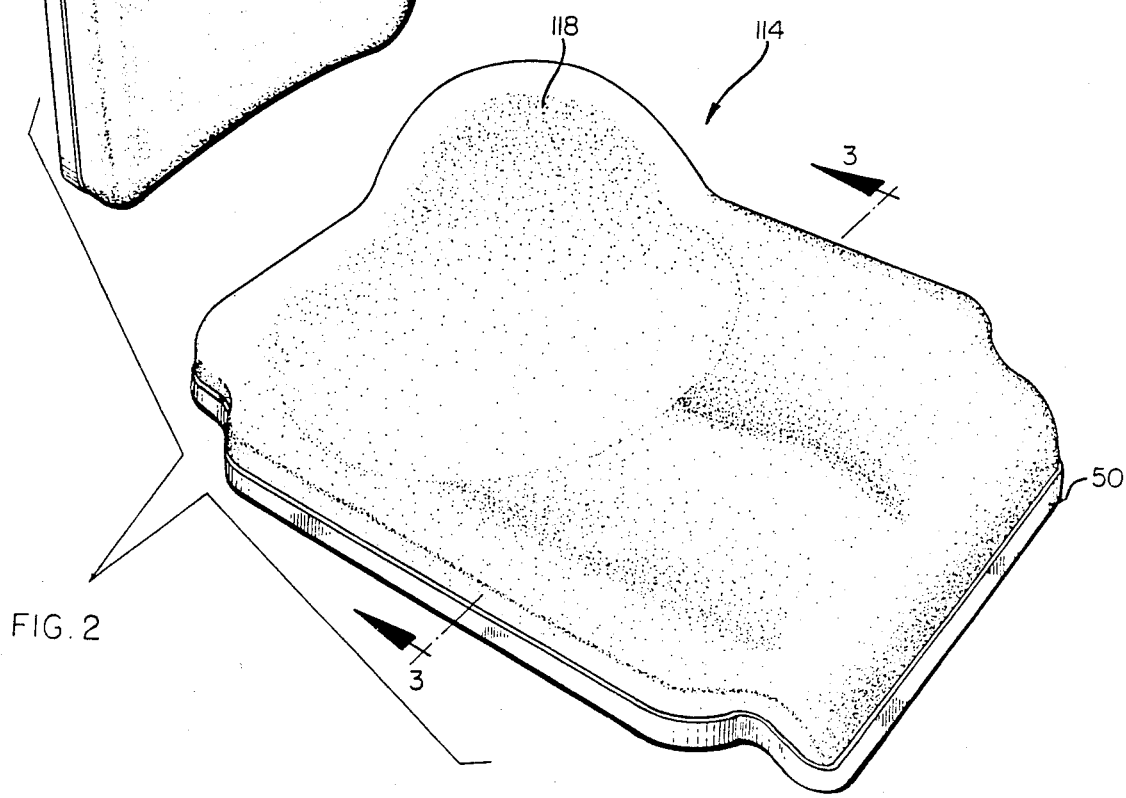
FIG. 2 is an enlarged perspective view of the seat and back cushions illustrated in FIG. 1.

With reference now to FIGS. 1 and 2, a rollable orthotic support 112 will be seen to have been provided by embodying a finished seat cushion element 114 and a finished back cushion element 116, constructed in compliance with the present invention, in the wheelchair framework 84. As described hereinabove, the cushion elements 114 and 116 will have been custom-fitted to the individual patient by utilizing a foam-in-place technique and by the provision of integral, body-posture controlling bolster structures, specifically, a hip-controlling bolster structure 118 and a rib cage-controlling bolster structure 120. As will be appreciated, the body posture-controlling bolster structures 118 and 120, which contain embedded therein a bolster-supporting assembly 75 comprised of tubular bolster support elements 52 and tubular foam elements 54, my be varied in accordance with the needs of the individual patient and as suggested in FIG. 6 and in the foregoing descriptions.

From the foregoing descriptions it will be appreciated that truly custom-fitted seating components are provided without resort to weighing devices or cutting equipment; and there is no need to readjust the fit of the components to the patient after initial fabrication. Moreover, it will be appreciated that neither the patient nor the therapist is exposed to chemical vapors since, the foaming reaction is caused to occur in a substantially closed system. It will also be appreciated that the principles of the present invention will find utility beyond orthotic seating and may be employed in fabricating custom-fitted seating components for aircraft pilots and race drivers, for example, or for utilization by long-distance truck drivers and in executive chairs.

Accordingly, the drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the following claims.

The invention is claimed as follows:

1. The method of making a custom-fitted cushion for a seating device or the like, which comprises the steps of: providing a mold box having an open side and venting passageway means of restricted aperture size; supporting said box in a fixed position; closing the open side of said mold box with a stretchable, substantially imperforate membrane, said membrane comprising an upper two-way stretch fabric layer and a lower elastic base layer bonded to said stretch fabric layer; deformably engaging said membrane with a portion of the subject's body, the subject's body contacting said stretch fabric layer portion of said membrane; injecting a predetermined quantity of an incipiently reacting, foaming, self-expanding and self-skinning resinous mixture into said mold box, said predetermined quantity being such that, after said resinous mixture expands, the volume of said resinous mixture would occupy at least 10% excess of the volume defined between the walls of said mold box and said deformed membrane, whereby to form a cushion, said resinous mixture foaming to a free-rise density of at least about 5 lbs/ft$^3$; allowing said foaming mixture to expand into forcible engagement with said membrane whereby said membrane, because of said upper twoway stretch fabric layer and the weight of the subject's body, resists the expansion of said foaming mixture and generates a density gradient in the finished foam such that the density is comparatively higher where said membrane is engaged by the subject's body and whereby said mixture stretchably inflates said membrane where said membrane is not engaged by the subject's body for contouring said cushion about the subject's body; restricting the venting of excess quantities of said mixture and any gases formed during the foaming thereof through said venting passageway means under back-pressure conditions to promote the generation of said density gradient; and permitting said mixture to set in continuation of the engagement of said membrane by the subject's body.

2. The method according to claim 1 which further comprises the step of attaching bolster support assembly means to said mold box for protruding into stretchable engagement with said membrane to receive a portion of said mixture in generating an integral, auxiliary cushion projection.

3. The method according to claim 1 wherein said membrane comprises a stretchable, upholstery surface layer and a base layer bonded face-to-face with said surface layer, said base layer being substantially impervious to said mixture and being substantially matched to said surface layer in the degree of elasticity.

4. The method according to claim 3 wherein said surface layer is a two-way stretch spandex fabric.

5. The method according to claim 4 wherein said base layer is a latex rubber sheet.

6. The method according to claim 1 wherein said subject's body is suspended in deformable engagement with said membrane by positioning-sling means.

7. The method according to claim 6 wherein said resinous mixture is a polyurethane mixture having an isocyanate-equivalent to hydroxyl-equivalent ratio of between about 0.75 and about 2.00.

8. The method according to claim 7 wherein said polyurethane mixture is fluorocarbon-blown.

9. A custom-fitted cushion for a seating device or the like made according to the method of claim 1.

10. A kit for making a custom-fitted cushion for a seating device or the like comprising: a mold box adapted to receive an incipiently reacting, foaming, self-expanding and self-skinning resinous means, including an open side, a fill opening, and venting passageway means of restricted aperture size; a stretchable, substantially imperforate membrane adapted to close the open side of said mold box; a first container for a first component of said mass; a second, separate container for a second component of said mass chemically reactible with said first component; and flexible mixing vessel means for use in receiving and manually mixing said components in a combination of laminar and turbulent mixing, said vessel means including coupling means for assembling said vessel means to said mold box at said fill opening.

11. A kit according to claim 10 wherein said mold box further includes a peripheral lip flange and wherein said apparatus further includes edge molding means for securing said membrane to said mold box at said lip flange for closing the open side of said mold box.

12. A kit according to claim 10 wherein said coupling means comprises a quick-connect assembly.

13. A kit according to claim 10 which further comprises temperature sensor means fastened to said first container and visually exposed exterior thereto to provide an indication of abnormal temperature conditions to which said first container has been exposed during storage and handling.

14. A kit according to claim 10 which further comprises temperature sensor means fastened to said mixing vessel means in thermal communication with the interior thereof and visually exposed exterior thereto to provide an indication of abnormal exotherm resulting from the reaction of said first and second components of the resinous mass.

15. A kit according to claim 10 which further comprises bolster support assembly means and wherein said mold box further includes attachment formations for use in mounting said bolster support assembly means to said mold box.

16. A kit according to claim 15 wherein said bolster support assembly means includes a tubular support element having at least one centrally positioned, radially opening aperture defining a vent hole, and a pair of foam or elastomeric tubes adapted to be positioned on said support element in spaced apart relation so as to avoid obstructing said vent hole, said tubes being adapted for adhesive engagement with said incipiently reacting resinous mass.

* * * * *

UNITED STATES PATENT AND TRADEMARK OFFICE
CERTIFICATE OF CORRECTION

PATENT NO. : 4,828,325

DATED : May 9, 1989

INVENTOR(S) : William R. Brooks

It is certified that error appears in the above-identified patent and that said Letters Patent is hereby corrected as shown below:

Column 1, line 58, "secomd" should be --second--;

Column 7, line 31, "th" should be --the--;

Column 9, line 52, "my" should be --may--;

Column 10, line 36, "twoway" should be --two-way--;

Column 11, line 16, "means" should be --mass--.

Signed and Sealed this

Twenty-first Day of November, 1989

*Attest:*

JEFFREY M. SAMUELS

*Attesting Officer*     *Acting Commissioner of Patents and Trademarks*